United States Patent
Kinugawa et al.

(10) Patent No.: US 9,312,542 B2
(45) Date of Patent: Apr. 12, 2016

(54) ELECTRODE PLATE FOR NONAQUEOUS ELECTROLYTE SECONDARY BATTERY, NONAQUEOUS ELECTROLYTE SECONDARY BATTERY INCLUDING THE SAME, AND METHOD FOR MANUFACTURING THE SAME

(71) Applicant: SANYO Electric Co., Ltd., Daito-shi, Osaka (JP)

(72) Inventors: Motoki Kinugawa, Kyoto (JP); Kenji Date, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 0 days.

(21) Appl. No.: 14/438,066

(22) PCT Filed: Oct. 23, 2013

(86) PCT No.: PCT/JP2013/006254
§ 371 (c)(1),
(2) Date: Apr. 23, 2015

(87) PCT Pub. No.: WO2014/068905
PCT Pub. Date: May 8, 2014

(65) Prior Publication Data
US 2015/0303478 A1 Oct. 22, 2015

(30) Foreign Application Priority Data

Oct. 30, 2012 (JP) .................... 2012-239542

(51) Int. Cl.
*H01M 4/02* (2006.01)
*H01M 4/62* (2006.01)
(Continued)

(52) U.S. Cl.
CPC ............ *H01M 4/622* (2013.01); *H01M 4/0404* (2013.01); *H01M 4/13* (2013.01);
(Continued)

(58) Field of Classification Search
None
See application file for complete search history.

(56) References Cited

U.S. PATENT DOCUMENTS

| 2011/0281161 A1 | 11/2011 | Ikeda et al. |
| 2012/0115027 A1 | 5/2012 | Uchida et al. |
| 2012/0135304 A1 | 5/2012 | Uchida et al. |

FOREIGN PATENT DOCUMENTS

| JP | 5-89871 A | 4/1993 |
| JP | 9-147834 A | 6/1997 |

(Continued)

OTHER PUBLICATIONS

JP10-270013A English Machine Translation 1998.*

(Continued)

*Primary Examiner* — Patrick Ryan
*Assistant Examiner* — Lucas J O Donnell
(74) *Attorney, Agent, or Firm* — Westerman, Hattori, Daniels & Adrian, LLP

(57) ABSTRACT

An electrode active material layer containing an electrode active material and a binder. The electrode active material layer includes a portion containing the smallest amount of the binder in a middle region across the thickness of the electrode active material layer. The binder is distributed in the electrode active material layer such that the amount of the binder increases continuously from the portion toward the core and an outer surface of the electrode active material layer. Preferably, the amount of the binder present in the electrode active material layer per unit thickness is limited to more than 10 in a region extending 10% of the thickness from the outer surface of the electrode active material layer, with 10 being assigned to the amount of the binder present in the electrode active material layer per unit thickness if the binder is uniformly distributed.

10 Claims, 1 Drawing Sheet

(51) Int. Cl.
*H01M 4/13* (2010.01)
*H01M 4/139* (2010.01)
*H01M 10/052* (2010.01)
*H01M 4/04* (2006.01)
*H01M 4/70* (2006.01)
*H01M 4/36* (2006.01)
*H01M 10/0587* (2010.01)

(52) U.S. Cl.
CPC ............. *H01M 4/139* (2013.01); *H01M 4/362* (2013.01); *H01M 4/62* (2013.01); *H01M 4/70* (2013.01); *H01M 10/052* (2013.01); *H01M 10/0587* (2013.01); *H01M 2220/20* (2013.01); *H01M 2220/30* (2013.01); *Y02E 60/122* (2013.01); *Y02P 70/54* (2015.11)

(56) References Cited

FOREIGN PATENT DOCUMENTS

| | | |
|---|---|---|
| JP | 9-185960 A | 7/1997 |
| JP | 10-270013 A | 10/1998 |
| JP | 10-284059 A | 10/1998 |
| JP | 2008-27633 A | 2/2008 |
| JP | 2008-258055 A | 10/2008 |
| JP | 2011-192539 A | 9/2011 |
| WO | 2010/089898 A1 | 8/2010 |
| WO | 2011/013413 A1 | 2/2011 |

OTHER PUBLICATIONS

International Search Report dated Jan. 14, 2014 issued in corresponding application No. PCT/JP2013/006254.

\* cited by examiner

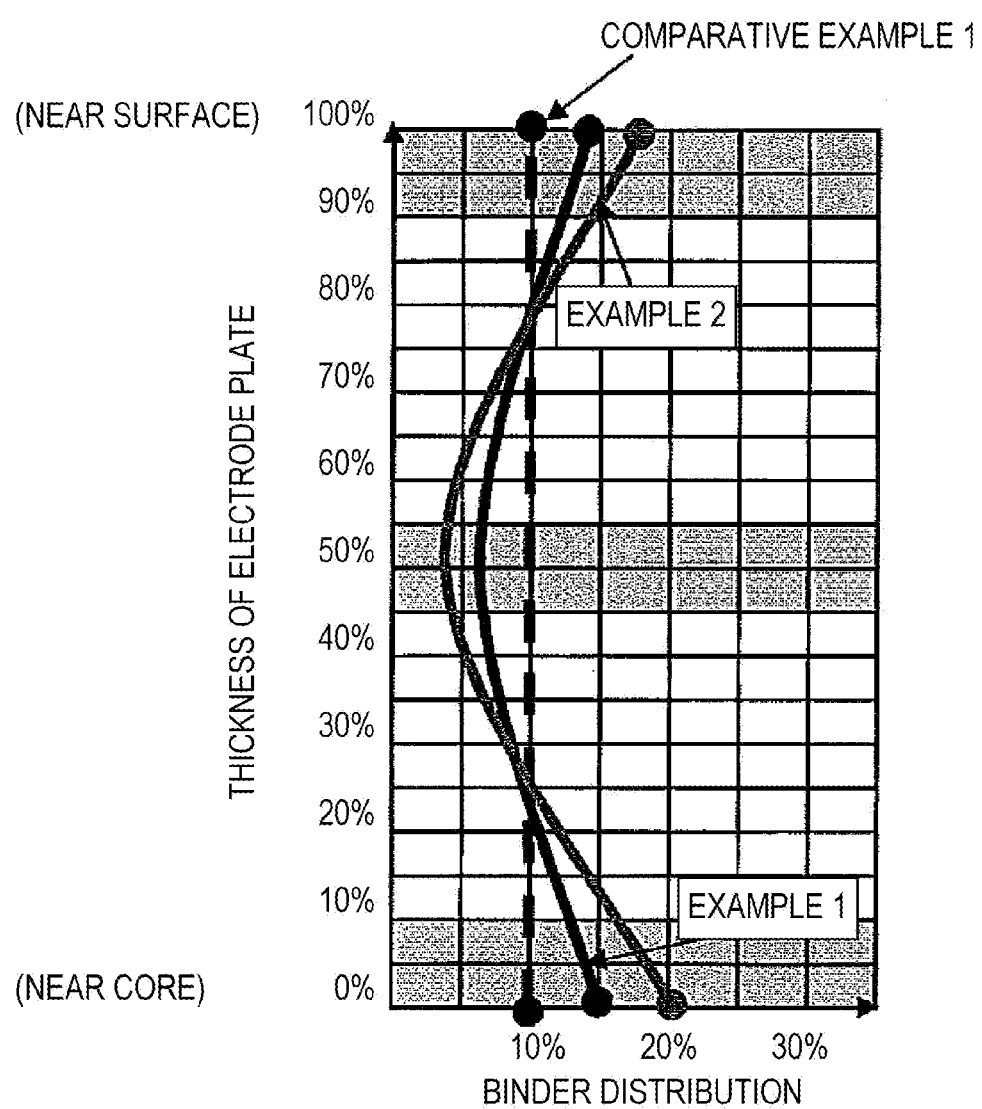

ELECTRODE PLATE FOR NONAQUEOUS ELECTROLYTE SECONDARY BATTERY, NONAQUEOUS ELECTROLYTE SECONDARY BATTERY INCLUDING THE SAME, AND METHOD FOR MANUFACTURING THE SAME

TECHNICAL FIELD

The present invention relates to improvements in the cycle characteristics of nonaqueous electrolyte secondary batteries.

BACKGROUND ART

Nonaqueous electrolyte secondary batteries are widely used as power supplies for driving portable devices such as cellular phones, smart phones, and notebook PCs because of their high energy density and high capacity. Recently, there has been a need for further improvements in the cycle characteristics of nonaqueous electrolyte secondary batteries.

Electrode plates used in nonaqueous electrolyte secondary batteries are manufactured by applying to a core an electrode active material slurry containing an electrode active material, a binder, and a solvent, drying the resulting coating, and pressing the coated core. This method is advantageous in terms of productivity and discharge characteristics.

The use of an excessive amount of binder, which does not directly contribute to charge and discharge, decreases the discharge capacity. The use of an insufficient amount of binder decreases the peeling strength of the electrode active material layer and thus results in the electrode active material easily peeling off the core.

Example techniques related to binders for nonaqueous electrolyte secondary batteries are disclosed in PTLs 1 to 5 below.

CITATION LIST

Patent Literature

PTL 1: Japanese Published Unexamined Patent Application No. 5-89871
PTL 2: Japanese Published Unexamined Patent Application No. 2011-192539
PTL 3: Japanese Published Unexamined Patent Application No. 9-147834
PTL 4: Japanese Published Unexamined Patent Application No. 2008-258055
PTL 5: Japanese Published Unexamined Patent Application No. 10-284059

PTL 1 discloses a secondary battery electrode including a coating layer of an active material on a metal current collector. A binder is distributed in the active material layer with a binder distribution coefficient of 0.5 to 5.0. PTL 1 teaches that this technique provides good battery characteristics.

PTL 2 discloses an electrode including a current collector, a first mixture layer formed on the current collector, and a second mixture layer formed on the first mixture layer. The second mixture layer contains a smaller amount of binder than the first mixture layer. PTL 2 teaches that this technique provides an electrode for nonaqueous electrolyte secondary batteries with good rate characteristics and cycle characteristics and high capacity.

PTL 3 discloses a negative electrode active material layer composed of first, second, and third negative electrode active material layers 7a, 7b, and 7c. The amount of the binder present in the negative electrode active material layer decreases stepwise outward from an interface with a current collector. PTL 3 teaches that this technique provides a battery with high capacity and energy density.

PTL 4 discloses a positive electrode including a positive electrode current collector and a plurality of positive electrode mixture layers disposed on the positive electrode current collector and containing a positive electrode material powder and a positive electrode binder. Of the plurality of positive electrode mixture layers, the innermost positive electrode mixture layer, i.e., the layer closest to the positive electrode current collector, has a higher positive electrode binder content than the other positive electrode mixture layers and contains 4% to 7% by weight of positive electrode binder. PTL 4 teaches that this technique provides a secondary battery with good output characteristics and cycle life characteristics.

PTL 5 discloses a technique for forming a negative electrode material layer on a current collector. This technique includes applying a binder solution containing a fluoropolymer binder and an organic solvent to each surface of a current collector made of copper foil, semidrying the coating to form a semidried binder layer, applying a carbon-based material dispersion prepared by mixing a mixture of graphite and a fluoropolymer with an organic solvent to the semidried binder layer on each side of the current collector, and drying the coating to form a negative electrode material layer. PTL 5 teaches that this technique provides sufficient adhesion between the negative electrode material layer and the negative electrode current collector without decreasing the discharge capacity.

Unfortunately, the batteries based on the techniques disclosed in PTLs 1 to 5 have insufficient cycle characteristics.

SUMMARY OF INVENTION

Technical Problem

An object of the present invention is to provide a nonaqueous electrolyte secondary battery with good cycle characteristics.

Solution to Problem

To solve the foregoing problem, an electrode plate for a nonaqueous electrolyte secondary battery according to the present invention is configured as follows.

The electrode plate for a nonaqueous electrolyte secondary battery includes a core and an electrode active material layer disposed thereon. The electrode active material layer contains an electrode active material and a binder. The electrode active material layer includes a portion containing the smallest amount of the binder in a middle region across the thickness of the electrode active material layer. The binder is distributed in the electrode active material layer such that the amount of the binder increases continuously from the portion toward the core and an outer surface of the electrode active material layer.

After conducting research on the relationship between the binder and the cycle characteristics, the inventors have made the following findings. As the binder is present in a larger amount, the electrode active material can accept fewer lithium ions since the surface thereof is covered by the binder, whereas the electrode active material layer can retain a larger amount of nonaqueous electrolyte. The cycle characteristics can be improved by achieving a balance of the ability to accept lithium ions and the amount of nonaqueous electrolyte during charge-discharge cycles.

In the above configuration according to the present invention, a larger amount of the binder is present near the core, where the amount of nonaqueous electrolyte tends to be insufficient, and accordingly a larger amount of nonaqueous electrolyte is retained near the core. The nonaqueous electrolyte is also supplied from near the outer surface, where a larger amount of binder is present and accordingly a larger amount of nonaqueous electrolyte is retained, to the middle region, where a smaller amount of binder is present (i.e., a smaller amount of nonaqueous electrolyte is retained) during charge-discharge cycles. As a result, the amount of nonaqueous electrolyte is balanced throughout the electrode active material layer, and charge-discharge cycles proceed smoothly throughout the electrode active material layer. This improves the cycle characteristics and reduces the resistance of the electrode plate. The abundant supply of nonaqueous electrolyte in the above configuration negates the adverse effect of the decrease in the ability to accept lithium ions, thus providing a nonaqueous electrolyte secondary battery with good cycle characteristics. The binder, which is present in a larger amount near the core, also reduces peeling of the electrode active material layer off the core, for example, upon impact.

The middle region of the electrode active material layer refers to a region extending from a position 10% of the thickness of the electrode active material layer to a position 90% of the thickness of the electrode active material layer from the surface of the electrode active material layer facing the core. Preferably, the portion containing the smallest amount of the binder is located in a region extending from a position 20% of the thickness of the electrode active material layer to a position 80% of the thickness of the electrode active material layer from the surface of the electrode active material layer facing the core. More preferably, the portion containing the smallest amount of the binder is located in a region extending from a position 45% of the thickness of the electrode active material layer to a position 55% of the thickness of the electrode active material layer from the surface of the electrode active material layer facing the core.

The binder is distributed such that the amount of the binder changes continuously, and there is no interface where the amount of the binder per unit thickness changes discontinuously in the electrode active material layer. Preferably, the gradient of the binder concentration is smaller in the middle region than near the outer surface and the core.

In the above configuration, the amount of the binder present in the electrode active material layer per unit thickness may be more than 10 throughout a region extending from a position 90% of the thickness of the electrode active material layer to a position 100% of the thickness of the electrode active material layer from the surface of the electrode active material layer facing the core, with 10 being assigned to the amount of the binder present in the electrode active material layer per unit thickness if the binder is uniformly distributed.

The above limitation is preferred to further improve the ability to retain the nonaqueous electrolyte near the outer surface.

The term "amount of binder present in the electrode active material layer per unit thickness" does not refer to the amount of the binder present in a particular region across the thickness of the electrode active material layer; rather, it refers to the amount of the binder present across the thickness of the electrode active material layer as expressed differentially.

By "the amount of the binder present in the electrode active material layer per unit thickness is more than 10 in a region extending from a position 90% of the thickness of the electrode active material layer to a position 100% of the thickness of the electrode active material layer from the surface of the electrode active material layer facing the core, with 10 being assigned to the amount of the binder present in the electrode active material layer per unit thickness if the binder is uniformly distributed", it is meant that there is no portion where the binder is present in an amount of 10 or less in the region extending from the position 90% of the thickness of the electrode active material layer to the position 100% of the thickness of the electrode active material layer from the surface of the electrode active material layer facing the core (i.e., in the region extending 10% of the thickness from the outer surface).

In the above configuration, the amount of the binder present in the electrode active material layer per unit thickness may be less than 10 in a region extending from a position 45% of the thickness of the electrode active material layer to a position 55% of the thickness of the electrode active material layer from the surface of the electrode active material layer facing the core, with 10 being assigned to the amount of the binder present in the electrode active material layer per unit thickness if the binder is uniformly distributed in the electrode active material layer. The amount of the binder present in the electrode active material layer per unit thickness may be more than 10 in a region extending from a position 0% of the thickness of the electrode active material layer to a position 10% of the thickness of the electrode active material layer from the surface of the electrode active material layer facing the core.

The above limitation on the amount of the binder in the region extending 10% of the thickness of the electrode active material layer from the surface of the electrode active material layer facing the core (i.e., the region extending from the position 0% of the thickness of the electrode active material layer to the position 10% of the thickness of the electrode active material layer from the surface of the electrode active material layer facing the core) is preferred to further reduce peeling of the electrode active material layer off the core. The above limitation on the amount of the binder in the middle region (i.e., the region extending from the position 45% of the thickness of the electrode active material layer to the position 55% of the thickness of the electrode active material layer from the surface of the electrode active material layer facing the core) is preferred to further improve the cycle characteristics.

Preferably, the lower limit of the amount of the binder in the region extending from the position 45% of the thickness of the electrode active material layer to the position 55% of the thickness of the electrode active material layer from the surface of the electrode active material layer facing the core is the minimum amount required to form the electrode active material layer.

In the above configuration, the electrode active material present in the electrode active material layer and the core may have a contact area fraction of 30% or more.

The above limitation is preferred to further reduce peeling of the electrode active material layer off the core. Preferably, the active material particles are partially embedded in the core.

Examples of the binder include known binders such as polyvinylidene fluoride, polytetrafluoroethylene, and styrene-butadiene rubber. In particular, styrene-butadiene rubber and modified styrene-butadiene rubbers are preferred since they can be used in combination with water, which is inexpensive and environmentally friendly, as a solvent to form the electrode active material layer. Suitable examples of the modified styrene-butadiene rubbers include carboxyl-modified and amino-modified styrene-butadiene rubbers.

The content by mass of the binder in the electrode active material layer may vary depending on the type of the binder. For example, the content by mass of the binder in the electrode active material layer may be 0.1% to 3.0% by mass for polyvinylidene fluoride, may be 0.1% to 5.0% by mass for polytetrafluoroethylene, or may be 0.1% to 5.0% by mass for styrene-butadiene rubber and modified styrene-butadiene rubbers.

To solve the foregoing problem, a nonaqueous electrolyte secondary battery according to the present invention is configured as follows.

The nonaqueous electrolyte secondary battery includes a positive electrode plate and a negative electrode plate. At least one of the positive electrode plate and the negative electrode plate is any of the above electrode plates for nonaqueous electrolyte secondary batteries.

To solve the foregoing problem, a method for manufacturing a nonaqueous electrolyte secondary battery according to the present invention is configured as follows.

The method for manufacturing a nonaqueous electrolyte secondary battery includes a first applying step of applying to a core a first electrode active material slurry containing an electrode active material, a binder, and a solvent; a second applying step of applying a second electrode active material slurry containing an electrode active material, a binder, and a solvent to an undried layer of the first electrode active material slurry; and a drying step of evaporating the solvent after the second step. The second electrode active material slurry has a lower solvent content by mass than the first electrode active material slurry. The electrode active material layer includes a portion containing the smallest amount of the binder in a middle region across the thickness of the electrode active material layer. The binder is distributed in the electrode active material layer such that the amount of the binder increases continuously from the portion toward the core and an outer surface of the electrode active material layer.

The first electrode active material slurry is applied to the core, and the second electrode active material slurry, which has a lower solvent content (i.e., a higher solids content (including the electrode active material, the binder, and other optional ingredients such as thickeners)) than the first electrode active material slurry, is applied to the undried layer of the first electrode active material slurry. The binder sinks below the interface between the layers of the first and second electrode active material slurries. This inhibits rising of the binder. In the subsequent drying step, the binder rises as the solvent evaporates from the electrode active material layer. These actions result in an electrode having the binder distribution as described above.

The drying speed during the drying step is preferably 5 g(solvent)/m$^2$·s or less, more preferably 4 g(solvent)/m$^2$·s or less. An extremely high drying speed may result in uneven drying and cracking of the electrode active material layer. The drying speed is also preferably 2 g(solvent)/m$^2$·s or more, more preferably 3 g(solvent)/m$^2$·s or more. An extremely low drying speed may result in low productivity and insufficient rising of the binder. The drying speed can be adjusted, for example, by controlling the atmospheric temperature and pressure during the drying step.

The first and second electrode active material slurries preferably contain the same binder. The first and second electrode active material slurries may have the same or different compositions. A third electrode active material layer may be formed on the undried second electrode active material layer.

The mass ratio of the solids in the first electrode active material slurry to the solids in the second electrode active material slurry before the drying step is preferably 0.1 to 10, more preferably 0.5 to 2.

Advantageous Effects of Invention

As described above, the present invention provides a nonaqueous electrolyte secondary battery with good cycle characteristics.

BRIEF DESCRIPTION OF DRAWING

FIG. 1 is a graph showing the binder distributions of negative electrode active material layers of Examples 1 and 2 and Comparative Example 1.

DESCRIPTION OF EMBODIMENTS

The best mode of practicing the present invention will now be described in detail by way of the following examples. It should be understood that the following examples are not intended to limit the present invention; various modifications are possible without departing from the spirit thereof.

EXAMPLES

Example 1

Fabrication of Positive Electrode

A positive electrode active material slurry was prepared by mixing 100 parts by mass of lithium cobaltate (LiCoO$_2$), serving as a positive electrode active material, 2 parts by mass of acetylene black, serving as a conductor, 2 parts by mass of polyvinylidene fluoride (PVdF), serving as a binder, and N-methyl-2-pyrrolidone.

The positive electrode active material slurry was applied to each surface of an aluminum core with a thickness of 15 μm using a doctor blade and was dried. The coated core was then pressed to a thickness of 170 μm using a press roller and was cut to form a positive electrode plate.

Fabrication of Negative Electrode

A negative electrode active material slurry A (second electrode active material slurry) was prepared by mixing 100 parts by mass of artificial graphite, serving as a negative electrode active material, 1 part by mass of carboxymethylcellulose, serving as a thickener, 1 part by mass, on a styrene-butadiene rubber (SBR) basis, of a dispersion of styrene-butadiene rubber in water (solids content: 40%), serving as a binder, and an appropriate amount of water that gave a total solids content of 48% to 55%, in a double-arm mixer.

A negative electrode active material slurry B (first electrode active material slurry) was prepared by mixing a portion of the negative electrode active material slurry A and an appropriate amount of water that gave a total solids content of 40% to 48% in a double-arm mixer.

The solids in the negative electrode active material slurry B had the same composition as the solids in the negative electrode active material slurry A. The negative electrode active material slurry B had a higher water (solvent) content by mass than the negative electrode active material slurry A.

The negative electrode active material slurry B was applied to each surface of a copper core with a thickness of 10 μm using a doctor blade. The negative electrode active material slurry A was then applied to the undried layer of the negative electrode active material slurry B using a doctor blade. The solids content by mass of the layer of the negative electrode active material slurry A was twice the solids content by mass of the layer of the negative electrode active material slurry B.

The coating was then dried at an average drying speed of 3 g(solvent)/m²·s. The coated core was pressed to a thickness of 200 μm using a press roller and was cut to form a negative electrode plate.

This negative electrode plate was analyzed for the distribution of the binder (SBR) across the thickness of the active material layer by image processing of a bromine-stained cross-section. FIG. 1 shows the binder distribution across the thickness of the active material layer. In this graph, the binder distribution is expressed in relative values, with 10 being assigned to the amount of the binder present in the negative electrode active material layer per unit thickness if the binder is uniformly distributed.

The amount of the binder present in the electrode active material layer per unit thickness was 12 to 15 throughout the region extending from a position 90% of the thickness of the electrode active material layer to a position 100% of the thickness of the electrode active material layer from the surface of the electrode active material layer facing the core, with 10 being assigned to the amount of the binder present in the negative electrode active material layer per unit thickness if the binder is uniformly distributed. The amount of the binder present in the electrode active material layer per unit thickness was 5.5 to 7 throughout the region extending from a position 45% of the thickness of the electrode active material layer to a position 55% of the thickness of the electrode active material layer from the surface of the electrode active material layer facing the core. The amount of the binder present in the electrode active material layer per unit thickness was 12 to 15 throughout the region extending from a position 0% of the thickness of the electrode active material layer to a position 10% of the thickness of the electrode active material layer from the surface of the electrode active material layer facing the core. The contact area fraction of the active material (artificial graphite) particles present in the active material layer and the core was 30% before pressing and was not less than 30% after pressing.

Fabrication of Electrode Assembly

A cylindrical electrode assembly was fabricated by winding the positive and negative electrode plates with a polyethylene microporous separator (thickness: 20 μm) therebetween and attaching a tape to the outermost surface thereof.

Preparation of Nonaqueous Electrolyte

A nonaqueous electrolyte was prepared by mixing ethylene carbonate, diethyl carbonate, and ethyl methyl carbonate in a volume ratio of 80:5:15 (at 25° C. and 1 atmosphere), dissolving $LiPF_6$, serving as an electrolyte salt, in a concentration of 1.0 M (mol/L), and adding 3% by mass of vinylene carbonate.

Assembly of Battery

The electrode assembly and 5.5 g of the nonaqueous electrolyte were placed in a cylindrical can. The opening of the can was then sealed with a sealing member to obtain a nonaqueous electrolyte secondary battery (height: 65 mm, diameter: 18 mm) of Example 1.

Example 2

A nonaqueous electrolyte secondary battery of Example 2 was fabricated as in Example 1 except that the solids content by mass of the layer of the negative electrode active material slurry A was once the solids content by mass of the layer of the negative electrode active material slurry B, and the coating was dried at an average drying speed of 4 g(solvent)/m²·s (with the total solids content being the same as in Example 1).

This negative electrode plate was analyzed for the distribution of the binder (SBR) across the thickness of the active material layer in the same manner as described above. The amount of the binder present in the electrode active material layer per unit thickness was 14 to 18 throughout the region extending from a position 90% of the thickness of the electrode active material layer to a position 100% of the thickness of the electrode active material layer from the surface of the electrode active material layer facing the core, with 10 being assigned to the amount of the binder present in the negative electrode active material layer per unit thickness if the binder is uniformly distributed. The amount of the binder present in the electrode active material layer per unit thickness was 3 to 4.5 throughout the region extending from a position 45% of the thickness of the electrode active material layer to a position 55% of the thickness of the electrode active material layer from the surface of the electrode active material layer facing the core. The amount of the binder present in the electrode active material layer per unit thickness was 16 to 21 throughout the region extending from a position 0% of the thickness of the electrode active material layer to a position 10% of the thickness of the electrode active material layer from the surface of the electrode active material layer facing the core. The contact area fraction of the active material (artificial graphite) particles present in the active material layer and the core was 30% before pressing and was not less than 30% after pressing.

Comparative Example 1

A nonaqueous electrolyte secondary battery of Comparative Example 1 was fabricated as in Example 1 except that a negative electrode was fabricated using only a negative electrode active material slurry C having a total solids content of 50%, and the coating was dried at an average drying speed of 4 g(solvent)/m²·s (with the total solids content being the same as in Example 1).

This negative electrode plate was analyzed for the distribution of the binder (SBR) across the thickness of the active material layer in the same manner as described above. The binder was uniformly distributed (see FIG. 1). The contact area fraction of the active material (artificial graphite) particles present in the active material layer and the core was 30% before pressing and was not less than 30% after pressing.

Cycle Characteristics Test

Batteries fabricated as in Examples 1 and 2 and Comparative Example 1 were charged and discharged twice under the following conditions and were then stored in an isothermal bath at 45° C. for 7 days. These batteries were charged and discharged again for 500 cycles under the following conditions. The capacity retention was calculated by the following equation. The results are shown in Table 1 below.

Charge: charged at a constant current of 1,400 mA to a voltage of 4.2 V and then at a constant voltage of 4.2 V to a current of 100 mA, at 25° C.

Discharge: discharged at a constant current of 2,000 mA to a voltage of 3.0 V, at 25° C.

Capacity retention (%)=discharge capacity at 500th cycle/discharge capacity at 1st cycle×100

Low-Temperature Cycle Characteristics Test

Batteries fabricated as in Examples 1 and 2 and Comparative Example 1 were charged and discharged for 100 cycles under the following conditions. The capacity retention was calculated by the following equation. The results are shown in Table 1 below.

Charge: charged at a constant current of 1,400 mA to a voltage of 4.2 V and then at a constant voltage of 4.2 V to a current of 100 mA, at −5° C.

Discharge: discharged at a constant current of 2,000 mA to a voltage of 3.0 V, at −5° C.

Capacity retention (%)=discharge capacity at 100th cycle/discharge capacity at 1st cycle×100

Measurement of Internal Resistance

Batteries fabricated as in Examples 1 and 2 and Comparative Example 1 were allowed to stand at 20° C. for 30 minutes and were then charged at a constant current of 0.2 It (440 mA) to a state of charge (SOC) of 50%. The batteries were then allowed to stand at 25° C. for 30 minutes. The batteries were then charged and discharged at a constant current of 1 It (2,200 mA) for 10 seconds. The voltage gradient dV/dA was calculated by dividing the difference between the charge-discharge cut-off voltage and the open-circuit voltage at an SOC of 50% by the current that flowed. In Table 1 below, the results are expressed as relative values, with 100 being assigned to Comparative Example 1.

TABLE 1

| | Binder distribution | | | Capacity retention (%) | | |
|---|---|---|---|---|---|---|
| | Near core | Middle | Near outer surface | −5° C. | 25° C. | Internal resistance |
| Example 1 | 12-15 | 5.5-7 | 12-15 | 88 | 62 | 95 |
| Example 2 | 16-21 | 3-4.5 | 14-18 | 90 | 73 | 91 |
| Comparative Example 1 | 10 | 10 | 10 | 83 | 56 | 100 |

FIG. 1 shows the binder distributions of the negative electrode active material layers.

In Examples 1 and 2, as shown in Table 1 and FIG. 1, the amount of the binder present in the negative electrode active material layer increased from the portion containing the smallest amount of binder in the middle region across the thickness of the electrode active material layer toward the core and the outer surface of the electrode active material layer. The batteries of Examples 1 and 2 had cycle capacity retentions at −5° C. of 88% and 90%, cycle capacity retentions at 25° C. of 62% and 73%, and internal resistances of 95 and 91, respectively. In Comparative Example 1, the amount of the binder present in the negative electrode active material layer was constant. The battery of Comparative Example 1 had a cycle capacity retention at −5° C. of 83%, a cycle capacity retention at 25° C. of 56%, and an internal resistance of 100. These results show that the batteries of Examples 1 and 2 had better characteristics than the battery of Comparative Example 1.

This can be explained as follows. As the binder is present in a larger amount, the electrode active material can accept fewer lithium ions since the surface thereof is covered by the binder, whereas the electrode active material layer can retain a larger amount of nonaqueous electrolyte.

In Examples 1 and 2, the binder was distributed in the electrode active material layer such that the amount of the binder increased continuously from the portion containing the smallest amount of binder in the middle region toward the core and the outer surface of the electrode active material layer. In this configuration, a larger amount of the binder is present near the core, where the amount of nonaqueous electrolyte tends to be insufficient, and accordingly a larger amount of nonaqueous electrolyte is retained near the core. The nonaqueous electrolyte is also supplied from near the outer surface, where a larger amount of the binder is present and accordingly a larger amount of nonaqueous electrolyte is retained, to the middle region, where a smaller amount of the binder is present (i.e., a smaller amount of nonaqueous electrolyte is retained) during charge-discharge cycles. As a result, the amount of nonaqueous electrolyte is balanced throughout the electrode active material layer, and charge-discharge cycles proceed smoothly throughout the electrode active material layer. This improves the cycle characteristics and reduces the resistance. The binder, which is present in a larger amount near the core, also reduces peeling of the electrode active material layer off the core, for example, upon impact.

The results also show that the batteries of Examples 1 and 2 tended to have a higher capacity retention and a lower internal resistance with increasing gradient of the binder distribution. The results also show that the gradient of the binder distribution can be controlled by changing the drying speed and the mass ratio of the solids in one active material slurry to the solids in the other active material slurry.

Additional Items

Whereas the present invention is applied to negative electrode plates in the foregoing examples, it can instead be applied to positive electrode plates or to both electrode plates.

Examples of the binder that can be used in the present invention include styrene-butadiene rubber, polyvinylidene fluoride, and polytetrafluoroethylene. The binder may be selected depending on, for example, the type of active material and the type of solvent.

A wide variety of known electrode active materials can be used in the electrode plates according to the present invention. Examples of the positive electrode active material include lithium cobalt nickel manganese oxide ($Li_xNi_aMn_bCo_cO_2$, where $0.9<x\leq1.2$ and $a+b+c=1$), spinel-type lithium manganate ($Li_xMn_2O_4$), and those in which the transition metal elements are replaced by other elements. These materials can be used alone or in mixture.

Examples of the negative electrode active material include carbon-based materials capable of absorbing and desorbing lithium ions (e.g., graphite, acetylene black, carbon black, and amorphous carbon), silicon-based materials, metallic lithium, lithium alloys, and metal oxides capable of absorbing and desorbing lithium ions. These materials can be used alone or in mixture.

The solvent used for slurry preparation may be water for styrene-butadiene rubber or may be N-methyl-2-pyrrolidone for polyvinylidene fluoride and polytetrafluoroethylene.

Examples of the nonaqueous solvent for nonaqueous electrolytes include carbonates, lactones, ketones, ethers, and esters. Specific examples include ethylene carbonate, propylene carbonate, butylene carbonate, diethyl carbonate, ethyl methyl carbonate, dimethyl carbonate, γ-butyrolactone, γ-valerolactone, γ-dimethoxyethane, tetrahydrofuran, and 1,4-dioxane.

Examples of the electrolyte salt other than $LiPF_6$ for nonaqueous electrolytes include $LiBF_4$, $LiAsF_6$, $LiCF_3SO_3$, $LiN(CF_3SO_2)_2$, $LiN(C_2F_5SO_2)_2$, and $LiClO_4$, which can be used alone or in mixture. The electrolyte salt is preferably dissolved in the nonaqueous solvent in a concentration of 0.5 to 2.0 mol/L.

Examples of the core for positive electrodes include pure aluminum cores and aluminum alloy cores. Examples of the core for negative electrodes include pure copper cores and copper alloy cores.

INDUSTRIAL APPLICABILITY

As described above, the present invention provides a nonaqueous electrolyte secondary battery with good cycle characteristics; thus, it has wide industrial applicability.

The invention claimed is:

1. An electrode plate for a nonaqueous electrolyte secondary battery, comprising a core and an electrode active material layer disposed thereon, the electrode active material layer containing an electrode active material and a binder, wherein
    the electrode active material layer includes a portion containing the smallest amount of the binder in a middle region across the thickness of the electrode active material layer, the binder being distributed in the electrode active material layer such that the amount of the binder increases continuously from the portion toward the core and an outer surface of the electrode active material layer.

2. The electrode plate for a nonaqueous electrolyte secondary battery according to claim 1, wherein the amount of the binder present in the electrode active material layer per unit thickness is more than 10 in a region extending from a position 90% of the thickness of the electrode active material layer to a position 100% of the thickness of the electrode active material layer from a surface of the electrode active material layer facing the core, with 10 being assigned to the amount of the binder present in the electrode active material layer per unit thickness if the binder is uniformly distributed.

3. The electrode plate for a nonaqueous electrolyte secondary battery according to claim 2, wherein
    the amount of the binder present in the electrode active material layer per unit thickness is less than 10 in a region extending from a position 45% of the thickness of the electrode active material layer to a position 55% of the thickness of the electrode active material layer from the surface of the electrode active material layer facing the core, and is more than 10 in a region extending from a position 0% of the thickness of the electrode active material layer to a position 10% of the thickness of the electrode active material layer from the surface of the electrode active material layer facing the core,
    with 10 being assigned to the amount of the binder present in the electrode active material layer per unit thickness if the binder is uniformly distributed in the electrode active material layer.

4. The electrode plate for a nonaqueous electrolyte secondary battery according to claim 1, wherein the electrode active material present in the electrode active material layer and the core have a contact area fraction of 30% or more.

5. The electrode plate for a nonaqueous electrolyte secondary battery according to claim 1, wherein the binder is styrene-butadiene rubber and/or a modified styrene-butadiene rubber.

6. A nonaqueous electrolyte secondary battery comprising a positive electrode plate and a negative electrode plate, at least one of the positive electrode plate and the negative electrode plate being the electrode plate for a nonaqueous electrolyte secondary battery according to claim 1.

7. A method for manufacturing a nonaqueous electrolyte secondary battery, comprising:
    a first applying step of applying to a core a first electrode active material slurry comprising an electrode active material, a binder, and a solvent;
    a second applying step of applying a second electrode active material slurry comprising an electrode active material, a binder, and a solvent to an undried layer of the first electrode active material slurry, the second electrode active material slurry having a lower solvent content by mass than the first electrode active material slurry; and
    a drying step of evaporating the solvent after the second step, wherein
    the electrode active material layer includes a portion containing the smallest amount of the binder in a middle region across the thickness of the electrode active material layer, and
    the binder is distributed in the electrode active material layer such that the amount of the binder increases continuously from the portion toward the core and an outer surface of the electrode active material layer.

8. A nonaqueous electrolyte secondary battery comprising a positive electrode plate and a negative electrode plate, at least one of the positive electrode plate and the negative electrode plate being the electrode plate for a nonaqueous electrolyte secondary battery according to claim 2.

9. A nonaqueous electrolyte secondary battery comprising a positive electrode plate and a negative electrode plate, at least one of the positive electrode plate and the negative electrode plate being the electrode plate for a nonaqueous electrolyte secondary battery according to claim 3.

10. A nonaqueous electrolyte secondary battery comprising a positive electrode plate and a negative electrode plate, at least one of the positive electrode plate and the negative electrode plate being the electrode plate for a nonaqueous electrolyte secondary battery according to claim 4.

* * * * *